Figure 1:
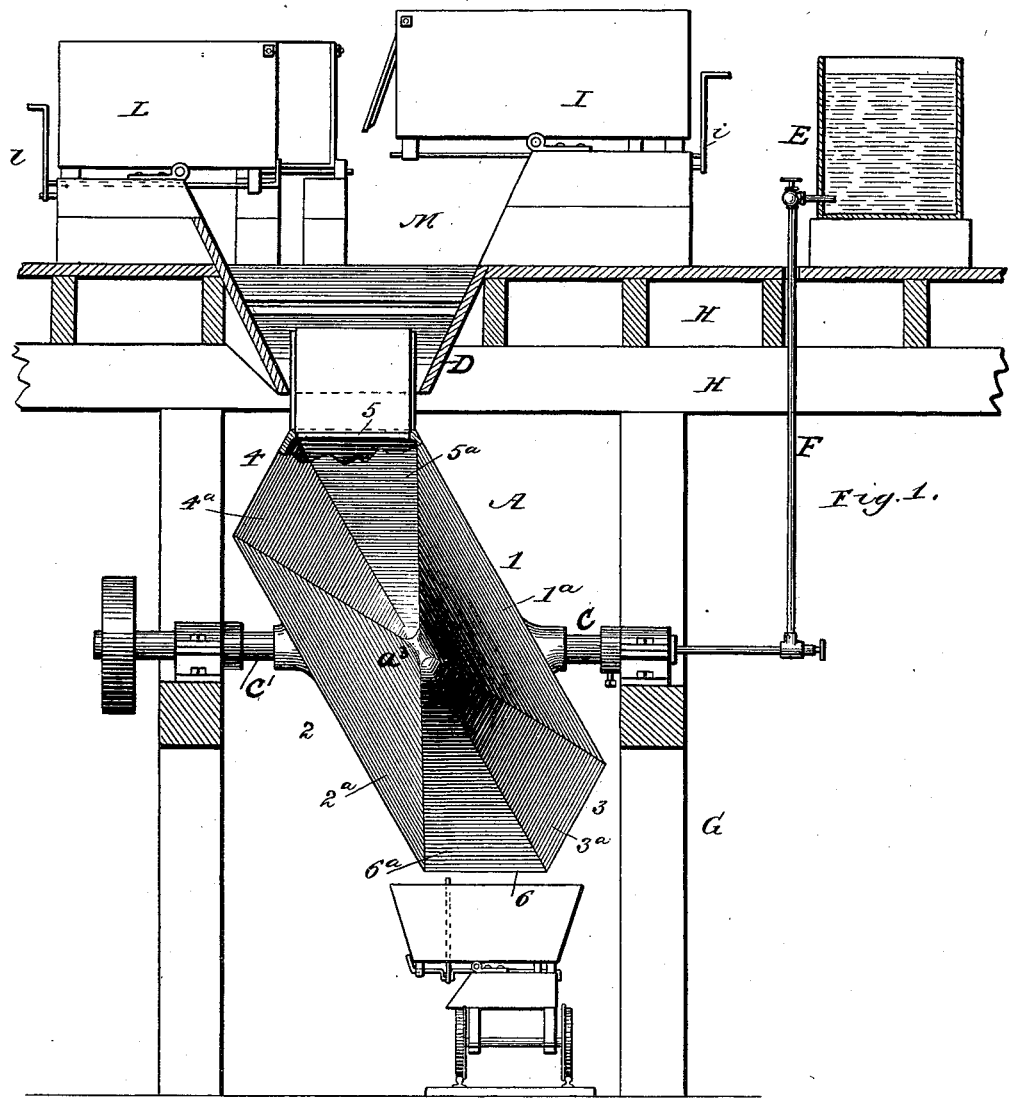

(No Model.) 2 Sheets—Sheet 1.

J. LUNDIE.
CONCRETE MIXER.

No. 366,591. Patented July 12, 1887.

Witnesses.

Inventor
John Lundie
By, Chas. G. Page
Atty.

(No Model.) 2 Sheets—Sheet 2.
J. LUNDIE.
CONCRETE MIXER.
No. 366,591. Patented July 12, 1887.
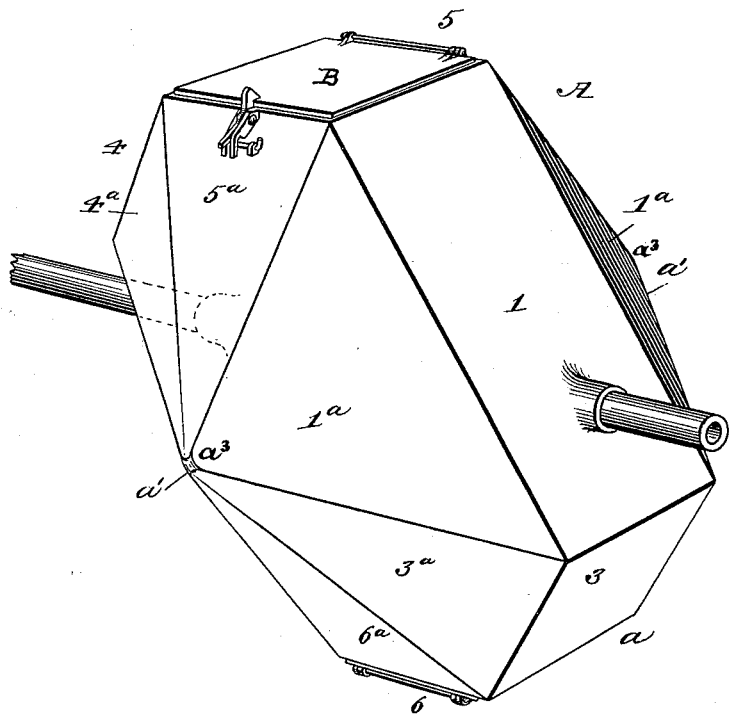
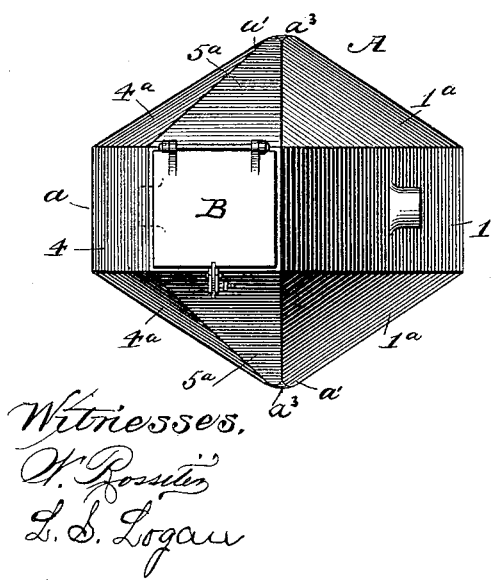
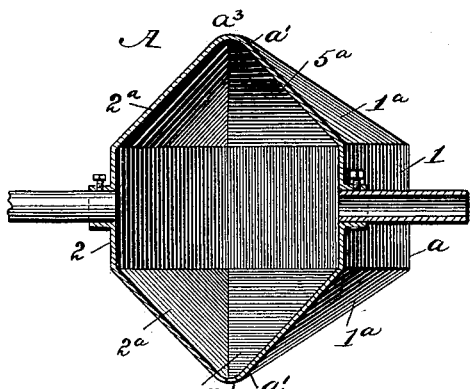
Witnesses,
W. Rossiter
L. S. Logan
Inventor,
John Lundie
By Chas. G. Page
Atty.

UNITED STATES PATENT OFFICE.

JOHN LUNDIE, OF CHICAGO, ILLINOIS.

CONCRETE-MIXER.

SPECIFICATION forming part of Letters Patent No. 366,591, dated July 12, 1887.

Application filed March 23, 1887. Serial No. 232,183. (No model.)

*To all whom it may concern:*

Be it known that I, JOHN LUNDIE, a subject of the Queen of Great Britain, but having declared my intention of becoming a citizen of the United States, residing at Chicago, in the county of Cook and State of Illinois, have invented certain new and useful Improvements in Concrete-Mixers, of which the following is a specification.
This invention relates to an improvement in apparatus adapted for mixing concrete, mortar, and the like, and involving the general feature of a rotary box or drum wherein the several ingredients to be mixed are collected in a mass, which, for the purpose of mixing together its several component parts, is agitated by revolving for a suitable length of time the rotary box or receptacle.

Various constructions of rotary drums and boxes, either with or without internally-arranged stirring devices, have been proposed for the aforesaid purpose. The employment of stirring devices within a rotary drum or box is decidedly objectionable in a concrete-mixing apparatus, for the reasons that it is difficult to clean out the rotary receptacle; that an objectionably large quantity of the material will be left sticking within the same, and that the discharge cannot be effected with the desired freedom and rapidity.

An internally-cylindric drum without stirrers would be extremely undesirable as the prime factor in a concrete-mixing apparatus, since the agitation of the contained mass as a result of the rotation of the drum would be entirely too slow for practical purposes.

It has heretofore been proposed to provide in a concrete-mixer a rotary rectangular box journaled at diagonally-opposite corners, with which construction and arrangement the contained mass of elements that are to be mixed will, as a matter of course, alternately shift toward opposite ends of the box during the rotation of the same. Such construction and arrangement, while involving certain advantages over cylindric drums and other forms of rotary boxes or receptacles, with or without stirrers, as shown by the state of the art to which this improvement appertains, have, nevertheless, certain disadvantages and attendant drawbacks, which it is one of the main objects of this improvement to obviate. The more prominent objectionable features of such rotary rectangular box journaled at diagonally-opposite corners are that the highest and lowest possible points of the box relative to the horizontal axis of rotation are the diagonally-opposite corners relatively between the two corners whereat the box is journaled, whereby, in providing at any one of the sides of the box a trap or door for the inlet and discharge of the material, a quick, free, and complete discharge of the contents cannot be effected by simply opening the trap or door when the box is in position to bring the same underneath, and, on the other hand, a chute or spout for conducting the materials into the box cannot be set as conveniently down to the same as may be desired.

It will also be observed that the rectangular configuration of the box tends to permit the concrete to collect and stick in the corners, which involves a serious objection to the use of such construction, and, also, that in emptying the box considerable labor becomes necessary to clean out the concrete from such corners. Besides which, while such box will partially intermix the material when revolved, it is far from being an economical form for the same, and is in fact only a crude approximation to the form I regard as necessary to the attainment of what may be considered as perfect results.

The objects of my invention are to provide a practically-perfect concrete-mixer and to avoid all disadvantages of the several constructions hereinbefore referred to; to effect a saving in time and labor by providing for a quick, ready, and thorough discharge from the rotary receptacle at such time as the trap or door thereof may be underneath; to provide a construction and arrangement whereby, while the material shall be thrown from side to side, it shall at the same time be alternately spread by being thrown on flat surfaces and gathered by being thrown on the inner sides of an inverted pyramid during the rotation of the receptacle containing the same; to provide a trap or door which shall be conveniently and practically formed and located so that when it is uppermost it shall lie at the very highest possible point at which any part of the receptacle can be brought into, and, conversely, when underneath it shall lie at the lowest point at which any part of the receptacle can be made to assume; to avoid the presence of any rectangular or acute-angular corner or corners within the receptacle; to provide simple and efficient means for gaging and filling the materials into the rotary mixing-receptacle, and to provide certain improved details of form and construction, all tending to promote the serviceability and general efficiency of concrete-mixers.

To the attainment of the foregoing and other useful ends my invention consists in matters hereinafter described, and particularly pointed out in the claim.

Figure 2:
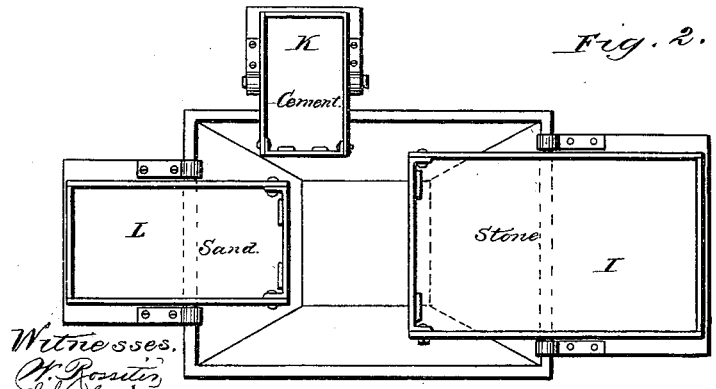

In the drawings, Figure 1 represents in elevation a rotary mixing-receptacle constructed and mounted in accordance with my invention, the trap or door of said receptacle being shown uppermost and open, with a portion of the casing adjacent to such door broken away for covenience of illustration. This view also includes a sectional elevation of an apparatus which I propose to employ as a means for gaging and supplying to the rotary mixing-receptacle the several articles that are to be therein mixed together. Fig. 2 represents a top plan view of such gaging and supply apparatus. Fig. 3 represents an isometric perspective of the rotary mixing-receptacle. Fig. 4 represents a plan view of the same with the trap or door uppermost. Fig. 5 is a section, taken through the box in Fig. 1, on a horizontal plane coincident with the axis of rotation.

The rotary mixing-receptacle consists of a polygonal box or shell, A, involving the following distinctive peculiarities in the formation or arrangement of its sides. The box may be said to comprise a polygonal-shaped middle portion, $a$, with two pyramidal end portions, $a'$, whereof the sides of each pyramidal end portion converge outwardly from the middle portion, the wider inner ends of the several sides of the pyramidal end portions being united with and in correspondence with the widths of the middle polygonal portion of the box. This middle portion of the box is desirably in the form of a hexagonal figure, of which the six sides, respectively indicated by the numerals 1, 2, 3, 4, 5, and 6, may in width vary somewhat from one another, in order to produce an oblong hexagonal figure. Thus the two sides 1 and 2 are the two longest sides of the figure and are parallel with each other, as best shown in Fig. 1, wherein it will be seen that the remaining sides, 3 to 6, inclusive, are about of equal widths with the oppositely-disposed sides 3 and 4, parallel with one another, and the oppositely-disposed sides 5 and 6 having to each other a similar relationship. Under such arrangement each pyramidal-shaped end portion of the box will have six sides, herein denoted as $1^a$, $2^a$, $3^a$, $4^a$, $5^a$, and $6^a$. All of these sides form with each other obtuse angles, so that there is not an acute or rectangular corner to be found within the box, and at the same time a multiplicity of sides is provided.

The corners $a^3$, at the points of convergence of the sides of the pyramidal end portions of the box, are internally rounded as a precaution against the mixed concrete or other like article sticking thereat.

The box is provided with a trap or door, B, at the side 5 of its middle oblong polygonal portion, and is journaled at the two longer sides 1 and 2 of its said middle portion. The journal C of side 1 is intermediate of the sides 3 and 5, but nearer in position to the side 3, while the journal C' of the opposite side 2 is intermediate of the sides 4 and 6, but nearer in point of position to the side 4, in which way the two longer sides 1 and 2 of the box will at all times be inclined and stand obliquely to a line running through the journals and representing the horizontal axis of rotation. By such arrangement, when the door is uppermost, as in Fig. 1, it will stand level and at the highest point to which any one of the sides can be brought, while, on the other hand, when the box is turned to bring the door underneath, such door will stand again level and at the very lowest point to which any one of the sides of the box can be brought.

During the rotation of the box the pyramidal end portions thereof will alternate with the short sides between the long sides 1 and 2 in taking the lowest and highest positions successively, in which way the mass of materials within the box will be alternately collected in a pyramidal portion of the box and spread out by being thrown against flat surfaces, while, at the same time by reason of the inclination of the sides 1 and 2, the mass will be successively thrown from one side to the other of the receptacle, thereby thoroughly and quickly mixing the materials together.

It will be seen that when the box is turned to bring the trap-door underneath, for the purpose of dumping, each and all of the inner sides will slope downwardly and finally converge toward and terminate in the edges of the doorway, whereby all of the slopes from the highest to the lowest point within the box will be in a direction to permit the material to slide freely to and through the open doorway, whereby a quick and clean discharge can be effected. On the other hand, when the box is turned to bring the door at the top, the door will be on a level and as close under the chute or hopper D as may be found desirable.

One of the journals is made hollow, in order to admit water from a supply-tank, E, through the medium of a supply-pipe, F, which enters the hollow journal in any suitable way.

But one door is shown in Fig. 1, although, if desired, two doors can be provided, as indicated in Fig. 3, one of said doors being at the side 5 and the other at the side 6. Suitable fastening devices are provided for holding the doors closed, it being observed that while the numerals 5 and 6 are herein used to denote two of the sides of a certain portion of the box, the door, where but one is used, forms when closed one of said sides, while if two doors are employed then the two doors constitute when closed the two sides 5 and 6. This arrangement is particularly desirable, since upon opening the door an entire side of the box is opened, and yet, by reason of the form of the box, said side will not demand a door of undesirably-large dimensions.

The box is herein shown mounted between a pair of substantial uprights at a height sufficient to permit a car-truck or the like to be brought below the box to receive the material dumped therefrom.

Upon a suitable platform, H, arranged overhead and supported by the uprights G, I propose to arrange dump-boxes for gaging materials—for example, a box, I, for containing crushed stone, a box, K, for containing cement, and a box, L, for containing sand, together with a water-tank which may be gaged to hold the exact quantity of water necessary. These several supply-receptacles are, with the exception of the water-supply tank, grouped around a chute or hopper, M, wherein they can discharge their particular contents simultaneously. Each one of said receptacles has one of its ends provided with a gate in position to discharge into the common hopper, and any suitable means can be provided for operating such gates—for example, rock-shafts having cranks at one end and means at their opposite ends for permitting them when operating to open and close the gates.

The lower discharge end of the hopper will be in register with the opening which is formed by opening the trap or door of the mixing-receptacle at a time when said door is uppermost, as in Fig. 1, in which case the door can be swung back out of the way or into a recess in the hopper, as may be preferred.

What I claim as my invention is—

In a concrete-mixing apparatus, the rotary mixing-box constructed with a polygonal middle portion and pyramidal end portions, substantially as described, said box being provided with a trap or door and journaled at oppositely-disposed sides of its middle polygonal portion, with said sides set obliquely to the axis of rotation, substantially as and for the purpose set forth.

JOHN LUNDIE.

Witnesses:
CHAS. G. PAGE,
L. S. LOGAN.